United States Patent

Stearns et al.

[11] Patent Number: 5,979,872
[45] Date of Patent: Nov. 9, 1999

[54] RETROFITTABLE CORROSION-RESISTANT VOLUME DAMPER

[75] Inventors: David P. Stearns, Somerville, Tenn.;
Shawn P. O. Ruffner, Bristol, Vt.

[73] Assignee: GDS Manufacturing Co., Williston, Vt.

[21] Appl. No.: 09/133,058

[22] Filed: Aug. 12, 1998

Related U.S. Application Data

[63] Continuation-in-part of application No. 08/858,281, May 19, 1997, abandoned.

[51] Int. Cl.[6] ........................................... F16K 1/22
[52] U.S. Cl. ........................... 251/305; 251/306; 251/367; 137/375
[58] Field of Search .................................... 251/111, 305, 251/306, 367; 137/375

[56] References Cited

U.S. PATENT DOCUMENTS

| | | | |
|---|---|---|---|
| 3,692,276 | 9/1972 | Conners et al. | 251/306 |
| 4,462,567 | 7/1984 | Habicht | 251/305 |
| 4,516,597 | 5/1985 | Ueda | 137/375 |
| 4,674,528 | 6/1987 | Nishio et al. | 137/375 |
| 4,697,615 | 10/1987 | Tsuchimoto et al. | 137/375 |
| 5,029,811 | 7/1991 | Yamamoto et al. | 251/306 |
| 5,236,003 | 8/1993 | Habicht | 251/306 |
| 5,806,830 | 9/1998 | Alvarez | 251/306 |

Primary Examiner—Steven O. Douglas
Assistant Examiner—Khoa Huynh
Attorney, Agent, or Firm—Theodore R. Touw

[57] ABSTRACT

A corrosion-resistant volume damper apparatus for use in gas- and vapor-handling duct systems, installed between existing external duct flanges without having to custom cut or otherwise modify the duct system or the volume damper itself. The retrofittable volume damper has a housing or framework with an aperture extending therethrough and a corrosion-resistant damper blade having integral pivot arms. The aperture or bore is of a suitable size and shape to match the duct system within which the volume damper is to be installed. The housing preferably comprises a pair of corrosion-resistant plates of suitably rigid materials. The two plates have a series of through holes permitting the two plates to be bolted together with a damper blade to be rotatably sandwiched between the plates such that one of the pivot arms of the damper blade extends beyond the two plates on a plane perpendicular to, and away from, the axis of the bore. Each of the two plates has substantially semi-circular ridges and, optionally, grooves adjacent to the inner edge of the aperture to provide sealing surfaces. The damper blade is rotatably adjustable to partially or completely occlude the bore and is preferably lockable in a desired rotatably adjusted angular position. The housing has standardized attachments allowing the apparatus to be installed between existing flanges on two sections of existing ductwork or against an existing flange on one end of existing ductwork.

21 Claims, 5 Drawing Sheets

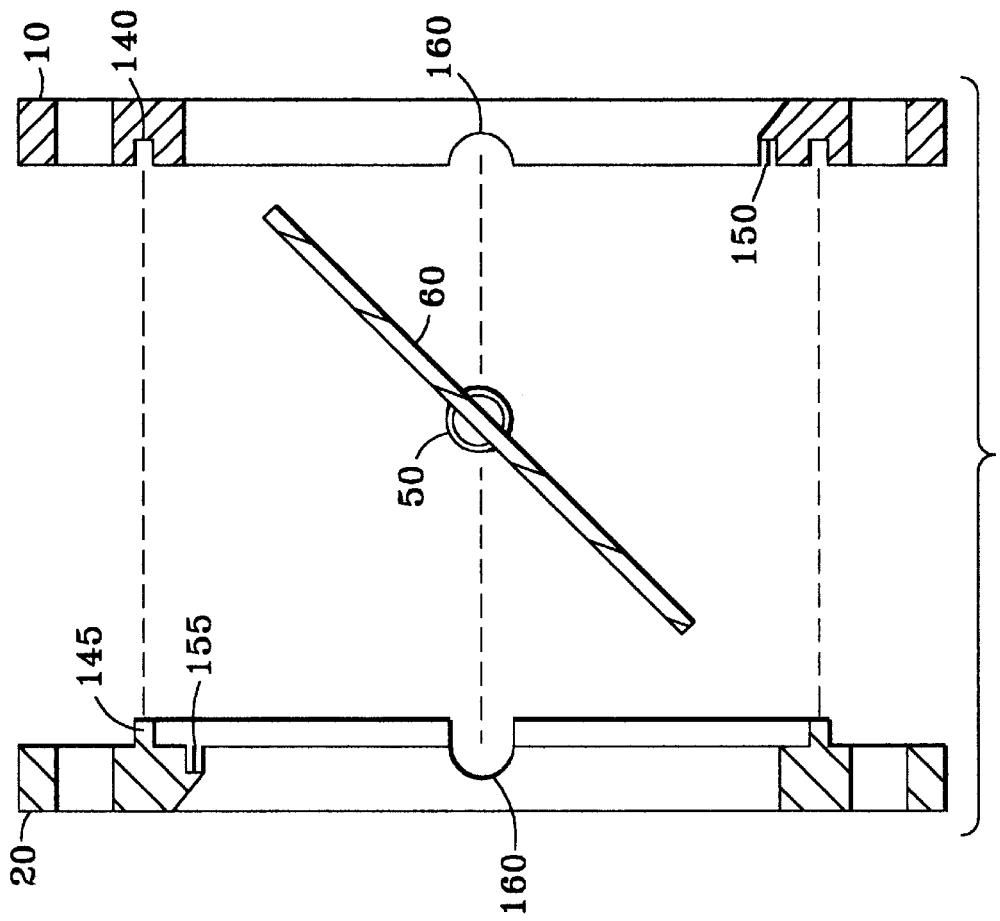
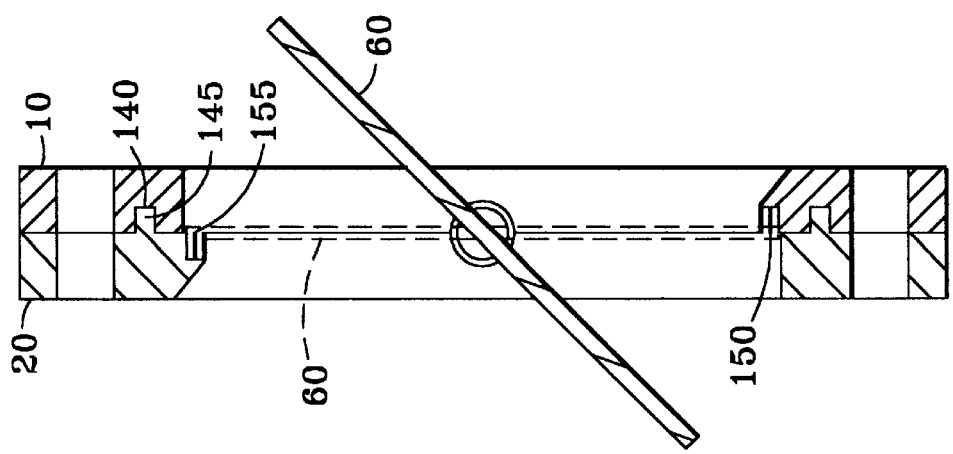

RETROFITTABLE CORROSION-RESISTANT VOLUME DAMPER

CROSS-REFERENCE TO RELATED APPLICATIONS

This application is a continuation-in-part of application Ser. No. 08/858,281 filed May 19, 1997, now abandoned.

FIELD OF THE INVENTION

The present invention relates generally to a volume damper and, more particularly, pertains to a corrosion-resistant volume damper device specially adapted to be retrofitted into existing duct work for use in controlling the flow of gases and vapors in an exhaust gas transfer system that is designed to handle a wide range of corrosive exhaust streams which may be found in a wide variety of industrial applications.

BACKGROUND OF THE INVENTION

The use of volume dampers for controlling air streams is well known. For example, a volume damper is disclosed in U.S. Pat. No. 4,186,719, to Dalsin (Device for Supplying Outside Cold Air to a Fireplace). U.S. Pat. No. 4,236,668 to Prikkel discloses a thermally responsive damper assembly having position controls, for mounting in a flue which vents gases from a region in which combustion is to occur. U.S. Pat. No. 4,399,806 to Love discloses a fireplace draft control, or volume damper. U.S. Pat. No. 4,691,689 to Shepherd discloses a one-piece adjustable damper. U.S. Pat. No. 4,669,499 to Miyake et al. discloses a valve casing for use in a butterfly valve, the valve casing having a double structure comprising an inner shell and an outer shell. U.S. Pat. No. 5,207,615 to Edmisten discloses a damper assembly for an air plenum system having a plurality of air duct lines. U.S. Pat. No. 5,257,772 to Habicht discloses a sanitary butterfly valve including a closable disc member carried by a resilient valve seat. The valve seat is compressed between a housing and clamp plate while being retained by a first acute lip and a second acute lip. U.S. Pat. No. 3,750,698 to Walchle et al. discloses a coated valving member for a butterfly-type valve, the valving member being coated with a protective coating material by a high-pressure and high-temperature molding process. The body plate of the coated valving member has a plurality of openings extending through the body plate. The protective coating material fills and extends through the openings to integrally attach the coating on opposite sides of the body plate. Thus both the basic concept of a volume damper and its general uses in various applications are known.

While each of these patents discloses volume dampers which fulfill their respective particular objectives and requirements and are most likely quite functional for their intended purposes, none of the background art discloses an apparatus that allows for the installation of a corrosion-resistant volume damper in an existing duct system without the necessity of custom-making the damper and/or custom-cutting the duct. Neither is there any volume damper especially adapted for easy installation between existing duct flanges. There still exists the need for a new and improved chemical-resistant and corrosion-resistant volume damper apparatus which is easily and inexpensively installed in new or existing exhaust air systems that are designed to handle a wide range of corrosive exhaust streams. In this respect and others, the invention disclosed herein substantially fulfills this need.

SUMMARY OF THE INVENTION

In view of the foregoing limitations inherent in the known types of corrosion-resistant volume dampers for exhaust air transfer systems now present in the prior art, the present invention provides an improved apparatus that has been designed by a manufacturer of exhaust air transfer systems for corrosive exhaust streams. Thus a general purpose of the present invention, which will be described subsequently in greater detail, is to provide an apparatus that incorporates the corrosion-resistant qualities of custom-made volume dampers of the prior art with the design of standardized air-transfer-system components to create a corrosion-resistant volume damper that is inexpensive and easy to install in new or existing air transfer systems. The invention may be installed between existing duct flanges or may be installed onto one side of a single existing duct flange. There are many additional novel features directed to solving problems not addressed in the prior art.

To attain this general purpose, the present invention generally comprises a housing or framework having an aperture in which a corrosion-resistant damper blade is pivotably mounted. The damper blade is formed in one piece with integral pivot arms. The housing is formed as a 2-piece split housing to allow insertion of a one-piece damper blade. The housing may comprise, for example, two corrosion-resistant plates of suitably rigid materials, each with an aperture or bore extending through it. The aperture is of a suitable size and shape to match the duct system within which the volume damper is to be installed. The housing has standardized attachment means, allowing the apparatus to be installed between two sections of an existing duct or at one end of an existing duct. To provide such standardized attachment means, the two plates preferably have a series of through-holes. The through-holes permit the two plates to be bolted together with a corrosion-resistant one-piece damper blade sandwiched between the plates, while also permitting the assembled housing to be installed between two sections of an existing duct or at one end of an existing duct.

The two plates of the housing also have opposed ridges and grooves, the ridge on one plate mating with a matching groove on the other plate when the two plates are brought together in assembly of the housing. These ridges and grooves extend along matching semicircular arcs concentric with the opening through each plate of the housing. Different ridges, also concentric with the opening of the volume damper, also extend along semicircular arcs in a generally annular region adjacent to the damper opening to form a blade-sealing surface to prevent leakage when the damper blade is rotated into the fully closed position (fully occluding the damper opening). These blade-sealing-surface ridges are preferably formed integrally with the plates of the housing, on a portion of their inside surfaces (facing the damper blade). These blade-sealing surfaces may also have concentric grooves adjacent to the ridges. The grooves are also formed integrally with the plates of the housing on a portion of the inside surfaces of the plates. Bushings surround the damper blade's integral pivot arms such that one of the pivot arms of the damper blade extends beyond the two plates on a plane generally perpendicular to, and away from, the axis of the damper opening or bore. The damper blade is rotatably adjustable to partially occlude the bore, or to completely occlude the bore by seating against the blade seal formed in each of the two plates. The damper is also preferably lockable in a desired rotatably adjusted position.

It is therefore an object of the present invention to provide a volume damper which is easy and inexpensive to install without customizing in an existing exhaust air transfer system that is designed to handle a wide range of corrosive exhaust streams. It is a related object to provide a volume damper that is corrosion-resistant and resistant to a wide variety of chemicals. It is another object of the present invention to provide a new corrosion-resistant volume damper apparatus which may be easily and efficiently manufactured, taught, and marketed. It is a further object of the present invention to provide a new volume damper apparatus which is of a durable and reliable construction and method of installation and operation. A particular object is to provide a volume damper which is adapted either for manual control or for automatic control using any of a variety of control devices. Another particular object is to provide a new corrosion-resistant volume damper which is susceptible of a low cost of manufacture with regard to both materials and labor, and which accordingly is then susceptible of low prices of sale to the public, thereby making such corrosion-resistant volume dampers economically available to the public. Yet another object of the present invention is to provide a corrosion-resistant volume damper which provides some of the advantages of the apparatuses and methods of the prior art, while simultaneously overcoming some of the disadvantages normally associated therewith. Other objects of the invention are a corrosion-resistant volume damper apparatus especially suitable for installation in an exhaust gas and vapor transfer system designed to handle a wide range of potentially corrosive exhaust streams, and an apparatus especially suitable for use in chemical and semiconductor processing industries. More specific objects of the invention include a volume damper with improved resistance to leakage, both along radial leakage paths and along generally axial leakage paths. These objects, together with other objects of the invention and various features of novelty which characterize the invention, are pointed out more particularly in the claims annexed to and forming a part of this disclosure. For a better understanding of the invention, its operating advantages, and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other that those set forth above will become apparent when consideration is given to the following detailed description. The description makes reference to the annexed drawings wherein:

FIG. 6 is a side elevation cross-sectional view of the apparatus in FIG. 4 taken along section 6—6; and FIG. 7 is a partially exploded cross-sectional view of the apparatus in FIG. 6.

DESCRIPTION OF PREFERRED EMBODIMENTS

Figure 1:
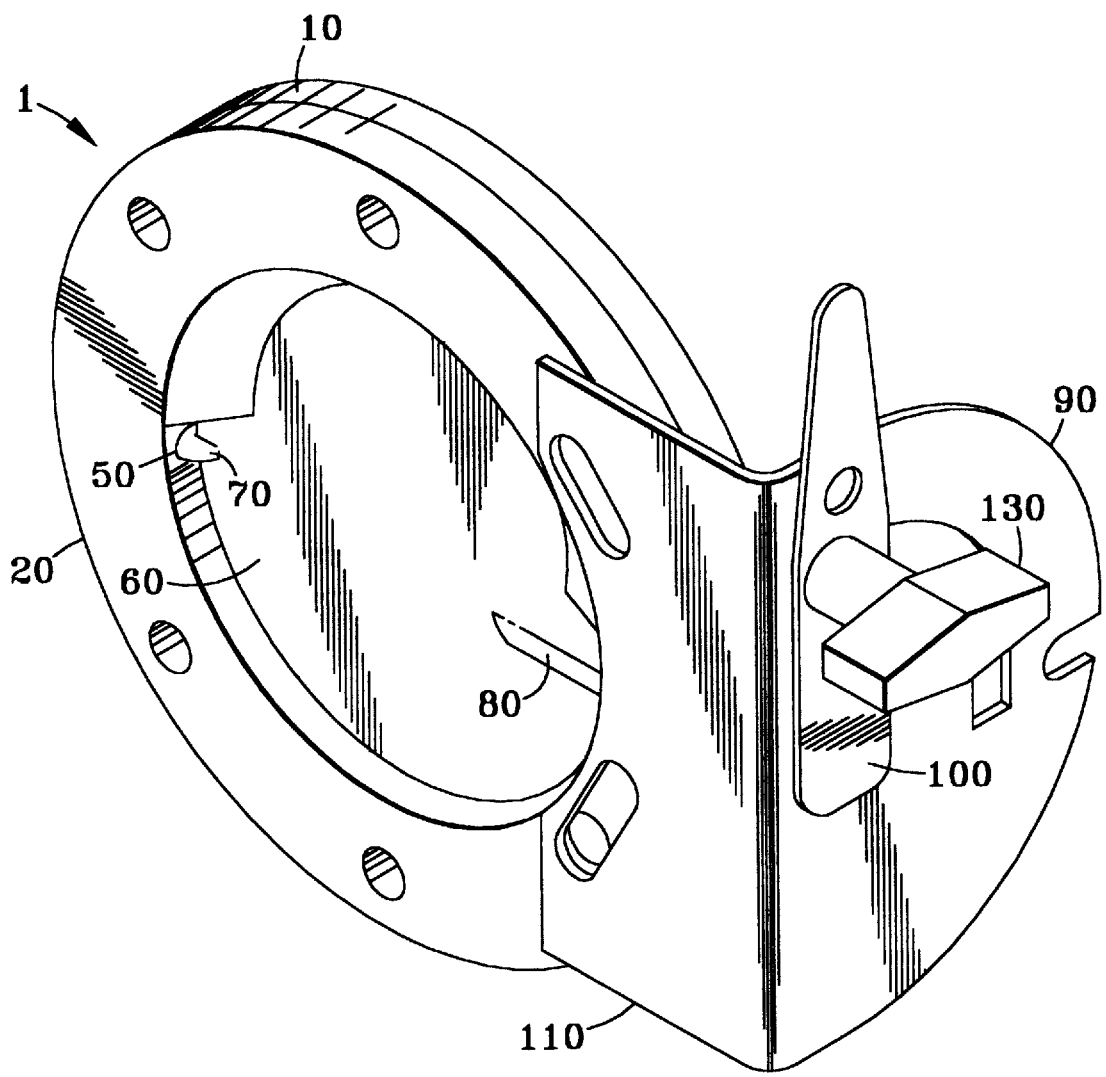
FIG. 1 is a perspective view of a corrosion-resistant volume damper apparatus made in accordance with the present invention.
Figure 2:
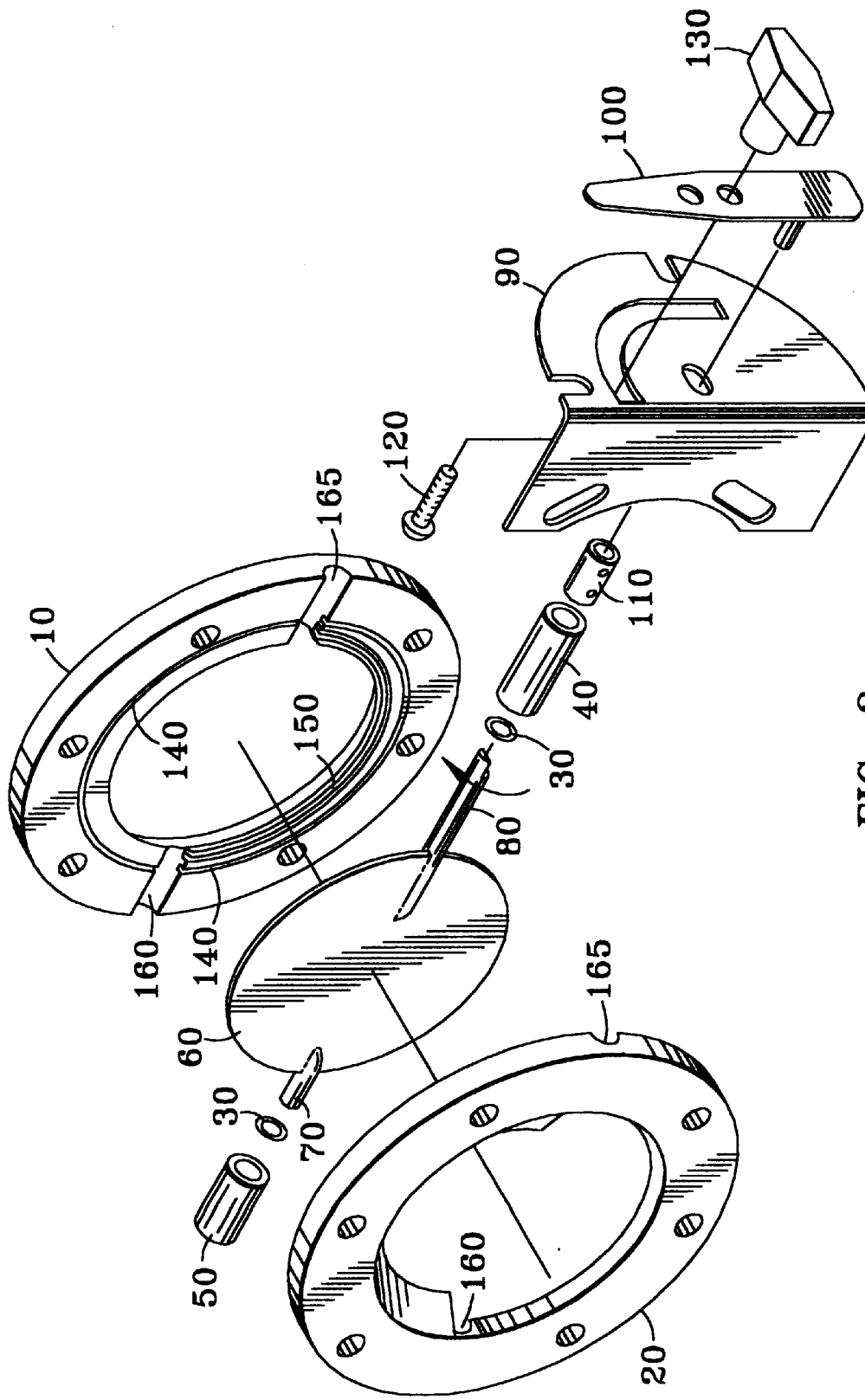
FIG. 2 is an exploded perspective view of the apparatus in FIG. 1.
Figure 3:
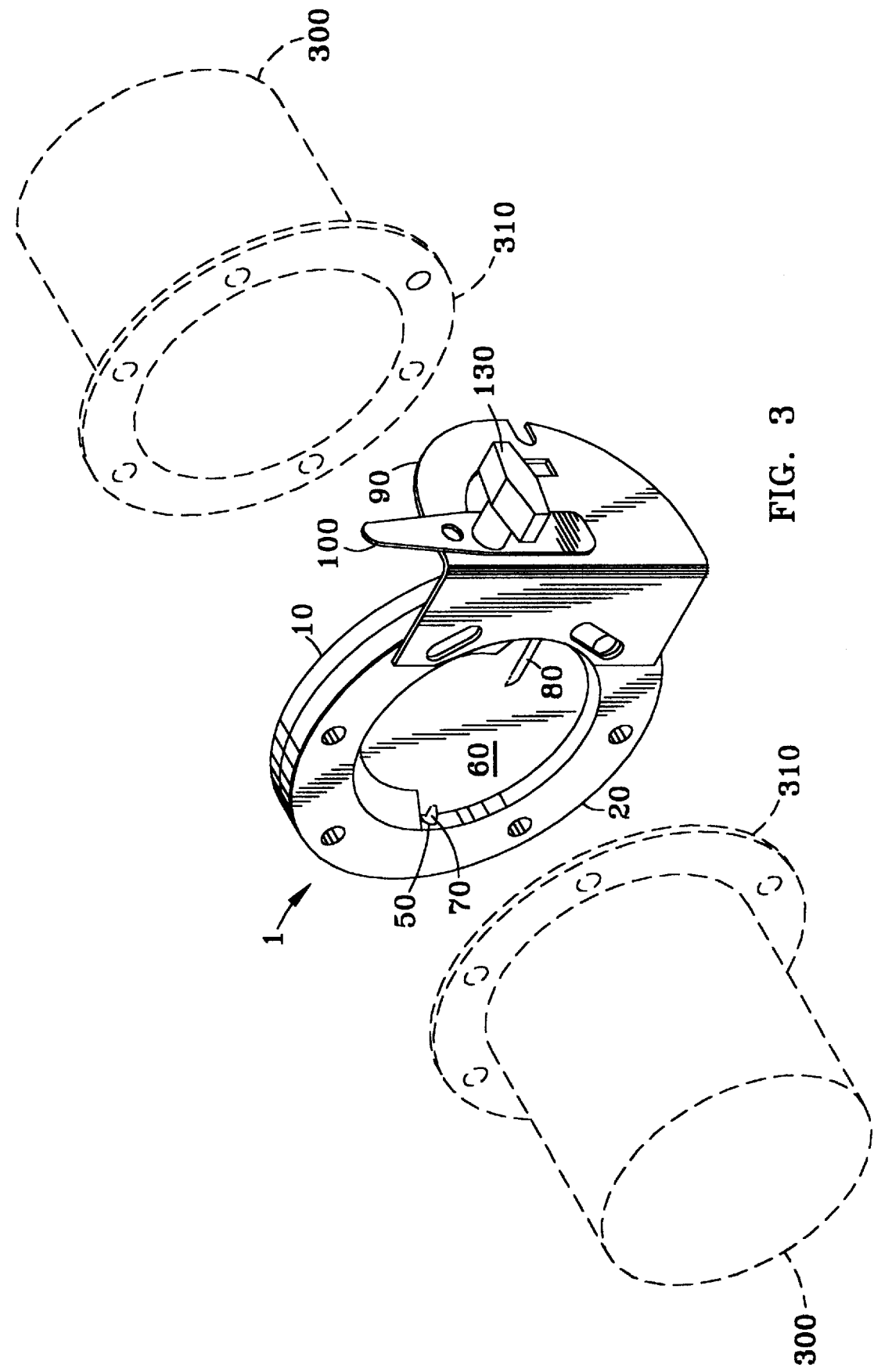
FIG. 3 is a perspective and partially exploded view of a volume damper apparatus, illustrating its installation between two existing duct flanges or at one side of a single existing duct flange.

With reference to the drawings, and in particular to FIGS. 1–2, a new corrosion-resistant volume damper apparatus embodying the principles and concepts of the present invention and generally designated by the reference numeral 1 in FIGS. 1 and 3 will be described.

Figure 5:
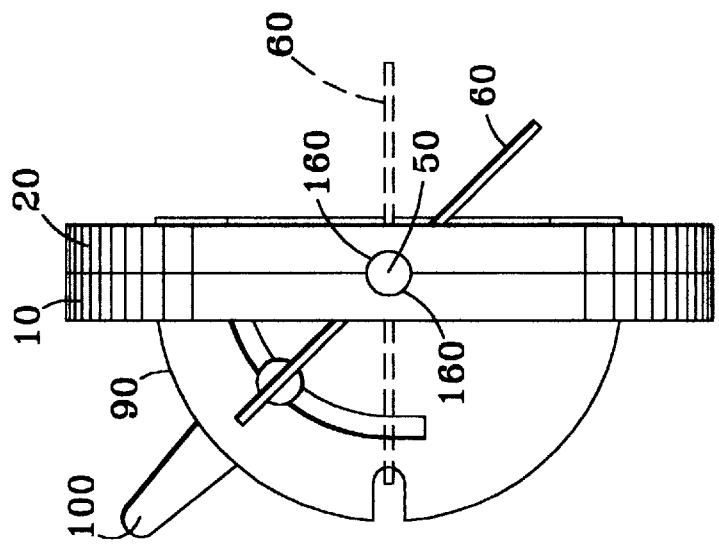
FIG. 5 is a side elevation view of the apparatus in FIG. 1, partially opened.
Figure 4:
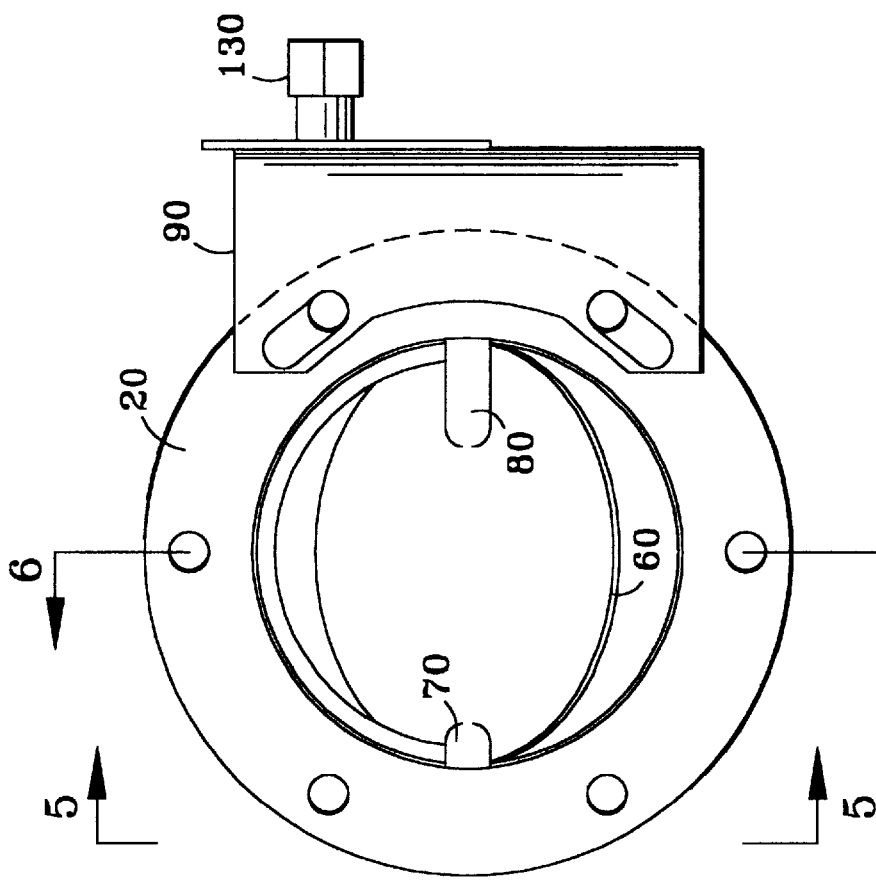
FIG. 4 is a front elevation view of the apparatus in FIG. 1, partially opened.

FIGS. 1–2 show the most preferred embodiment of an apparatus 1 in accordance with this invention for a corrosion-resistant volume damper. FIG. 3 is a perspective and partially exploded view of a volume damper apparatus, illustrating its installation between two existing duct flanges or at one side of a single existing duct flange. FIG. 4 is a front elevation view of the apparatus in FIG. 1, partially opened, and FIG. 5 is a side elevation view of the apparatus in FIG. 1, partially opened. As shown in the drawings, apparatus 1 comprises a number of primary components, preferably including a corrosion-resistant plate 10 and a corrosion-resistant plate 20 formed with suitably rigid and corrosion-resistant materials such as a fluoropolymer, preferably polytetrafluoroethylene (PTFE). Each of the plates 10 and 20 has an aperture or bore of a suitable size and shape to match the size and shape of the bore of the duct in the duct system within which the volume damper is to be installed. Each of the corrosion-resistant plates 10 and 20 has a series of through-holes permitting the two plates to be bolted together with a series of conventional corrosion-resistant bolts (not shown) and vibration- and corrosion-resistant locking nuts (not shown). The through-holes are disposed in pairs, the two members of each pair being aligned opposite each other. Utilizing the same bolts and nuts, the apparatus 1 is installed by inserting the bolts through the corresponding holes of the existing duct flanges 310 of the existing ductwork 300 as shown in FIG. 3. FIG. 3 shows how a volume damper apparatus is installed between two existing duct flanges 310. If one of the existing duct flanges 310 were omitted from FIG. 3, the drawing would illustrate how a volume damper apparatus is installed on one side of an existing duct flange 310.

The inner surfaces of plates 10 and 20 (the surfaces facing each other when plates 10 and 20 are assembled together) have a circular groove 140 and matching circular ridge 145 respectively, which mate when plates 10 and 20 are assembled together. Groove 140 is visible in FIG. 2 on the inner surface of plate 10. Matching circular ridge 145 is formed on the inner side of plate 20, hidden in FIG. 2. Both groove 140 and ridge 145 and their relationship are shown in the cross-sectional views of FIGS. 6 and 7. When mated as shown in FIG. 6, groove 140 and ridge 145 provide a barrier to radial leakage from the volume damper, i.e., leakage in a direction from the damper opening to the rim of the volume damper, thus contributing to the overall improved leakage performance of the volume damper of this invention.

To provide further improvement of leakage performance, corrosion-resistant plate 10 and corrosion-resistant plate 20 have blade-sealing surfaces 150 and 155 for preventing leakage when the volume damper is fully closed by rotating damper blade 60 to a closed position. Blade-sealing surfaces 150 and 155 are preferably cast or cut within a portion of the inner surface of each plate 10 and 20, as shown in FIGS. 6 and 7. In its simplest form, blade-sealing surface 150 comprises a raised ridge formed parallel to and adjacent to the edge of one half of the aperture through plate 10, with a thin cross-section having sufficient resilience to provide a seal when damper blade 60 is rotated into a closed position and an portion of damper blade 60 adjacent to its edge presses against sealing surface 150. Blade-sealing surface 155, formed similarly on plate 20, performs in an identical manner. The raised ridges forming blade-sealing surfaces 150 and 155 may each have parallel adjacent grooves also formed on the inner surface of each plate 10 and 20. The formation of blade-sealing surfaces 150 and 155 is facilitated by making plates 10 and 20 of a suitably resilient fluoropolymer, preferably polytetrafluoroethylene (PTFE). The raised ridges and adjacent grooves of blade-sealing surfaces 150 and 155 may have triangular cross-sections (not shown in the drawings), forming relatively more resilient and compressible surface features for improved sealing.

Preferably, multiple concentric sealing surfaces 150 are formed in a region adjacent to the edge of one half of the aperture through plate 10 on the inner face of plate 10 (the surface facing plate 20 when the apparatus 1 is bolted together and installed in the duct, as shown in FIGS. 2, 6, and 7). Likewise multiple concentric sealing surfaces 155 are preferably formed in a region adjacent to the edge of one half of the aperture through plate 20 on the inner face of plate 20 (the surface facing plate 10 when the apparatus 1 is bolted together and installed in the duct, as shown in FIGS. 6 and 7) such that the multiple concentric sealing surfaces 150 and 155 together form a circular or generally annular region about the aperture. That annular region is interrupted by two diametrically opposed semicylindrical channels 160 and 165 that are cast or cut into the corrosion-resistant plate 10 and corrosion-resistant plate 20.

Damper blade 60 and its long and short integral pivot arms 70 and 80 are made of a suitable rigid corrosion-resistant material such as porcelain-coated steel or stainless steel. The circular body portion of damper blade 60 may be coated with a fluoropolymer, preferably a 1:1 alternating copolymer of ethylene and chlorotrifluoroethylene. Damper blade 60 has a shorter integral pivot arm 70 upon which is placed a bushing 50 with an internal O-ring 30 that fits snugly and removably around the shorter pivot arm 70. Damper blade 60 also has a longer integral pivot arm 80 that runs through a second bushing 40 with an internal O-ring 30 that fits snugly and removably around the longer pivot arm 80. Corrosion-resistant plate 10 and corrosion-resistant plate 20 are bolted in place with damper blade 60 pivotably sandwiched between them such that semicircular channels 160 and 165 surround the bushings 40 and 50, and the longer pivot arm 80 extends beyond the rims of the assembled plates 10 and 20. The longer pivot arm 80 further extends through a needlecage bearing 110. Control arm support plate 90, which is also bolted to the outside of either plate 10 or 20, supports needlecage bearing 110 in a hole therein as the longer pivot arm 80 extends beyond the lateral surface of the control arm support plate 90. Control arm 100 is removably but securely attached to the notched end of the longer pivot arm 80 protruding from the control arm support plate 90. A locking bolt 120 with a shoulder is placed through a ninety degree arced hole through the control arm support plate 90, through a hole in the control arm 100, and is locked in place with a locking device 130. Once installed in a duct the volume of gases passing through the duct may be controlled by moving the control arm 100 which when moved will rotatably adjust the position of damper blade 60 whose integral pivot arms 70 and 80 are sandwiched between the plates 10 and 20. The adjustable range includes a closed position where damper blade 60 is seated against the multiple concentric sealing surfaces 150 and 155, fully occluding the apertures in plates 10 and 20, and is continuously variable to an open position ninety degrees from the closed position. Any desired position of the continuously variable positions may be locked in place by tightening the locking device 130.

FIGS. 2, 6, and 7 also illustrate why the circular body portion of damper blade 60 is made larger than the damper opening. If the diameter of the circular body portion of damper blade 60 were equal to the diameter of the damper opening or smaller than the opening, as it is in many dampers of the prior art, leakage of air or other gases could occur around the rim of the damper blade even when the damper blade was in its fully "closed" position. As shown especially in FIGS. 6 and 7, each of the sealing surfaces 150 and 155 extends inwardly on its own side toward the center of the damper opening, making the opening smaller than the diameter of the circular body portion of damper blade 60. Therefore, when damper blade 60 is in its fully closed position, an annular region near the rim of damper blade 60 is seated against sealing surfaces 150 and 155. The shape and resilience of sealing surfaces 150 and 155 allow damper blade 60 to compress the sealing surfaces 150 and 155 slightly, providing an improved seal. Thus, in the volume damper of the present invention, leakage around the edge of damper blade 60 is substantially prevented when damper blade 60 is in its fully closed position. This damper-blade sealing feature, together with the improved sealing against radial leakage provided by the combination of circular groove 140 cooperating with matching circular ridge 145, provides a volume damper assembly with improved leakage performance.

Leakage tests performed on a volume damper of about 20.3 cm. (8 in.) diameter, made with seals in accordance with the invention have shown superior results for leakage in comparison with volume dampers available heretofore. The tests were conducted in accordance with the Air Movement and Control Association (AMCA) Standard 500-89 "Test Methods for Louvers, Dampers, and Shutters" (revised 1994). At a temperature of 58° F. and barometric pressure of 29.6 in. Hg, and with static pressures of 6, 10, and 14 WG (inches of water), leakage measurements on the volume damper were all below the lowest measurable limits of 0.35 cfm or 1 cfm/sq.-ft. These superior leakage test results demonstrate the effectiveness provided by the volume damper of the invention.

With respect to the above description then, it is to be realized that the optimum dimensional relationships for the parts of the invention, to include variations in size, materials, shape, form, function and manner of operation, assembly, and use, are readily apparent to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. For example, while continuous variation of the volume damper blade angular setting is generally desirable, a locking mechanism which locks the damper blade at a finite number of discrete angular positions may be substituted, or an electrical stepping motor may be attached to a pivot arm to rotate the damper blade into discrete angular positions. As another example, non-corrosion-resistant materials may be substituted for the preferred materials for applications in which corrosion resistance is not important.

What is claimed is:

1. A volume damper assembly for mounting to one or more existing flanges of ductwork, said volume damper assembly comprising:

a) a damper housing having first and second major surfaces, said damper housing having an opening communicating with said first and second major surfaces, said damper housing comprising first and second plates which define said opening, said first plate being removably fastenable to said second plate;

b) a damper blade pivotably disposed within said opening, said damper blade including a circular body portion having a diameter larger than said opening, and said damper blade being adjustable in angle for variably occluding said opening, said damper blade further comprising first and second integral pivot arms, said integral pivot arms having axes aligned one with the other and aligned with a diameter of said circular body portion, said integral pivot arms being disposed between said first and second plates of said housing; and c) attachment means for securing said damper housing to at least one existing flange of the ductwork, said attachment means being disposed to align with and engage said at least one existing flange.

2. A volume damper assembly as in claim 1, further comprising:

d) locking means for securing said damper blade at a desired angle with respect to said opening.

3. A volume damper assembly as in claim 2 wherein said damper housing, said damper blade, said locking means, and said attachment means comprise suitably corrosion-resistant materials.

4. A volume damper assembly as in claim 1 wherein each of said first and second plates of said damper housing comprises polytetrafluoroethylene material.

5. A volume damper assembly as in claim 1 wherein said damper blade comprises polytetrafluoroethylene material.

6. A volume damper assembly as in claim 1 wherein said damper blade comprises material selected from stainless steel and porcelain-coated steel.

7. A volume damper assembly as in claim 1 wherein said damper blade comprises stainless steel having at least said circular body portion coated with polytetrafluoro ethylene material.

8. A volume damper assembly as in claim 1 wherein said damper blade comprises stainless steel having at least said circular body portion coated with a 1:1 alternating copolymer of ethylene and chlorotrifluoroethylene.

9. A volume damper assembly as in claim 1, wherein said damper housing (a) has sealing surfaces disposed adjacent to said opening for preventing leakage when said damper blade is adjusted to fully occlude said opening.

10. A volume damper assembly as in claim 9 wherein said sealing surfaces comprise at least one arcuate ridge disposed adjacent to said opening and concentric with said opening.

11. A volume damper assembly as in claim 10 wherein said sealing surfaces further comprise at least one arcuate groove disposed parallel with said arcuate ridge.

12. A volume damper assembly as in claim 9 wherein at least one arcuate ridge of said sealing surfaces is integrally formed with at least one of said first and second plates of said damper housing.

13. A volume damper assembly as in claim 1 wherein said attachment means (c) are disposed in pairs, the two members of each pair of attachment means being aligned opposite each other.

14. A volume damper assembly as in claim 1 for use with at least one existing flange having existing bolt holes disposed in a pattern, wherein said attachment means (c) comprise one or more through holes disposed to match said pattern of said existing bolt holes, for insertion of bolts for attaching said volume damper assembly to said at least one existing flange.

15. A volume damper assembly as in claim 1 for use with at least one existing flange having bolt holes disposed in a pattern, wherein said attachment means (c) comprises one or more threaded studs disposed to match said pattern of said bolt holes, each of said threaded studs being affixed to said first plate of said housing, and each of said threaded studs having a sufficient length to extend through both said second plate of said housing and said at least one existing flange.

16. A volume damper assembly as in claim 15 wherein each of said one or more threaded studs has first and second ends, said first end being fixed to one of said first and second major surfaces of said damper housing.

17. A volume damper assembly for mounting to at least one existing flange of ductwork, said at least one existing flange having bolt holes disposed in a pattern, said volume damper assembly comprising:

a) a damper housing having first and second major surfaces, said damper housing having a damper opening communicating with said first and second major surfaces, and said damper housing having sealing surfaces disposed adjacent to said damper opening, said damper housing comprising first and second plates, said first plate having a first opening, said second plate having a second opening, said first plate being removably fastened to said second plate with said first and second openings at least partially aligned, thereby providing said damper opening;

b) a damper blade pivotably disposed within said damper opening, said damper blade having a diameter larger than said damper opening, and said damper blade being adjustable in angle to variably occlude said damper opening;

c) attachment means for securing said damper housing between the existing flanges of the ductwork, said attachment means being disposed to align with and engage said existing flanges; and d) locking means for securing said damper blade in a desired angle with respect to said damper opening.

18. A volume damper assembly as in claim 17 wherein said sealing surfaces comprise at least one arcuate ridge disposed adjacent to said opening and concentric with said opening and at least one arcuate groove disposed parallel with said arcuate ridge, both said at least one arcuate ridge and said at least one arcuate groove being formed integrally with at least one of said first and second plates and being disposed to face said damper blade when said damper blade is adjusted to a closed position.

19. A volume damper assembly as in claim 17 wherein said first and second plates have inner major surfaces disposed to face each other, further comprising a circular ridge on said inner surface of said first plate and a matching circular groove in said inner surface of said second plate, said circular ridge mating with said circular groove for preventing radial leakage.

20. A volume damper assembly for mounting to at least one existing flange of ductwork, said volume damper assembly comprising:

a) a damper housing comprising a first plate and a second plate, said first plate having first plate inner and outer major faces and an outer rim, a first plate aperture extending through said first plate, a first blade-sealing surface extending along at least a portion of said first plate inner major face adjacent to said first plate aperture, at least one first semi-cylindrical recess extending radially from said rim to said first plate aperture, and a circular ridge on said first plate inner major face, said circular ridge having a ridge diameter;

said second plate having inner and outer second plate major faces and an outer rim, a second plate aperture extending through said second plate, a second blade-sealing surface extending along at least a portion of said second plate inner major face adjacent to said second plate aperture, at least one second semi-cylindrical recess extending radially from said rim to said second plate aperture, and a circular groove in said second plate inner major face, said circular groove having a groove diameter matching said ridge diameter, said circular groove being disposed to mate with said circular ridge and said second semi-cylindrical recess being disposed to align with said first semi-cylindrical recess to define a cylindrical passage when said inner major faces of said first plate and said second plate are placed together to form said damper housing, said first and second plates each having means for securing said damper housing to said at least one existing flange of ductwork, said means for securing being disposed to align with and engage said at least one existing flange; and b) a damper blade having a generally circular body, a first integral pivot arm, and a second integral pivot arm, said circular body being larger than either of said first or second plate apertures, said damper blade further being rotatably sandwiched between said inner major faces of said first and second plates with at least one of said first and pivot arms being rotatably disposed within said cylindrical passage, said damper blade being rotatably adjustable from a first position partially occluding said first and second plate apertures to a second position completely occluding said first and second plate apertures, while seating against said first and second blade-sealing surfaces.

21. A volume damper assembly as in claim 20 wherein first integral pivot arm is longer than said second integral pivot arm, and said first integral pivot arm extends beyond said outer rim of said first and second plates, said volume damper assembly further comprising:

a control arm attached to said first integral pivot arm; and a control-arm locking means attached to said control arm and to said damper housing for locking said damper blade in a desired angular position.

* * * * *